UNITED STATES PATENT OFFICE.

SADAKICHI SATOW, OF SENDAI, JAPAN.

VARNISH AND PROCESS OF MAKING THE SAME.

1,280,861.    Specification of Letters Patent.    Patented Oct. 8, 1918.

No Drawing.    Application filed November 25, 1916. Serial No. 133,313.

*To all whom it may concern:*

Be it known that I, SADAKICHI SATOW, a subject of the Emperor of Japan, residing at Sendai, Japan, have made a certain new and useful Invention in Varnish and Process of Making the Same, of which the following is a specification.

This invention relates to varnish and method of making the same.

It is among the special purposes of my present invention to utilize vegetable proteids in the manufacture of varnish and to thereby produce a varnish which possesses many important and valuable advantages over hitherto known varnishes.

It is also among the special purposes of my invention to provide a method of making varnish which is simple, economical and efficient.

In carrying out my invention I employ, as raw material, any suitable material or substances containing vegetable proteids, such as leguminous or other vegetables, cereals, grain or the like. Examples of such raw material are beans, peas, wheat, corn and the like.

The raw material containing the vegetable proteids is crushed to break down the cellular structure thereof, and, if the material contains an undesirable percentage of oil, the oil content of the crushed mass is removed. This may be effected in any suitable manner, as, for example by treating the mass with an oil solvent such as benzin. The oil solvent is then removed from the mass. The mass thus produced, I will call "meal" or "proteid meal," and the proteidal substances contained therein are separated therefrom to produce a refined proteid product. This separation of the proteidal substances from the "proteid meal" may be effected in various ways. According to one method the "meal" is treated with an alkaline solution, such as a dilute solution of caustic or carbonted alkali, or caustic or carbonated ammonia, and the proteidal substances, either with or without further purification of the resulting liquid, are precipitated therefrom. The further purification referred to may be accomplished mechanically by filtration, centrifuging, or the like; by fractional precipitation, fractional solution of precipitated impure proteids, or by converting one or more components into other chemical compounds having different properties which enable their separation; or one or more of these various purifying methods may be employed in combination with the others. The precipitation of the refined proteidal substances is accomplished by adding a suitable acid, such as sulfuric, sulfurous, acetic or phosphoric acid, or by a suitable ferment, such as lactic or acetic.

According to another method the meal is treated with water and the refined proteidal products are precipitated out of the resulting liquid, either with or without purification thereof, as above explained, the precipitation being effected with an acid or a ferment as above described.

According to still another method the meal is treated with an aqueous salt solution, such as sodium chlorid, ammonium sulfate, or the like, and the resulting liquid either with or without further purification as explained, is subjected to dialysis.

The proteidal substances obtained as above described are suitable and highly efficient for use in making varnish in accordance with my invention.

In the preparation of the varnish the proteidal substances, obtained as above described, are kneaded with a suitable glutinizing agent to produce a very viscid semi-transparent sticky fluid. Various glutinizing agents may be employed for this purpose, either basic or acidic. I have found that among the basic agents suitable for the purpose the following may be used:

(*a*) Caustic alkali, such as caustic soda or potash; carbonated alkali, such as sodium carbonate, or potassium carbonate; or ammonia or ammonium carbonate; or caustic lime and the like.

(*b*) Alkaline salts, such as borax, sodium phosphate, and the like, having the property of reacting alkaline in aqueous solution.

(*c*) Organic bases, such as urea, pyridin, glycin, and other basic amino compounds, or the like.

Among the acidic agents suitable for use in carrying out my invention I have found that the following can be used with excellent results:

(*d*) Organic acids of the fatty acid series, such as formic, acetic, propionic, phenyl-propionic, malonic and the like.

(*e*) Organic acids of the oxy-fatty series such as lactic, tartaric, citric, malic and the like.

(f) Organic acids or acidic compounds of aromatic series, such as carbolic, salicylic, benzoic, and the like.

(g) Inorganic acids, such as phosphoric acid and sulfurous acid, and the like.

I have also found that a mixture of the basic or a mixture of the acidic agents may also be employed as a glutinizing agent in carrying out the principles of my invention.

I find that, ordinarily, a suitable disinfectant should also be added to prevent fermentation, and that a very small percentage of phenol, salicylic acid, or creosote will answer this purpose. In this case the phenol or other disinfecting agent acts only as a disinfectant.

The viscid semi-transparent sticky fluid thus obtained consists of a whitish emulsified solution of gelatinized protein derivatives and when applied as a surface coating or varnish for wood, metal or the like it forms, when dry, a hard colorless and transparent film.

I have found, however, that the glutinized proteidal varnish is very greatly improved in all respects and characteristics, especially its durability, and resistance to water, heat, weather and outer mechanical forces, if a suitable condensing agent, preferably an active methylene compound, such as formaldehyde, or the like, is added to the glutinized proteidal liquid, or to the mass, while being kneaded with a glutinizing agent, as above described. Though the glutinized proteids condense rapidly under ordinary conditions when treated with a condensing agent, the presence of an excess of water greatly retards condensation to such an extent that condensation does not appear to take place. Therefore, by varying the amount of water present in the mass the condensing action is correspondingly controlled thereby controlling the quality of the varnish product at will.

Proteidal varnish produced as above described is free from resin or oil or organic solvent such as alcohol or turpentine, water being employed in the manufacture thereof instead of alcohol or turpentine oil. It is colorless and transparent and consequently, when applied to wood or other surfaces it does not produce a yellowish or brownish color which is characteristic of common varnish employing resin, but leaves the natural color and shades of the substance, wood, or the like, to the surface of which the varnish is applied. It requires no special skill in applying the varnish, and it dries with moderate speed—not too rapidly nor too slowly, as is frequently the case with ordinary varnish now in common use. It is not affected by varying weather conditions, alcohol, hot water, or heat, and does not crack or peel off. It strongly resists the action of dilute alkalis, or of acids. It is readily susceptible of being polished when applied to a surface. The requirement of an expensive organic solvent in the manufacture thereof is avoided thereby rendering the manufacture of the varnish economical. If desired, any desired pigment may be mixed with the varnish, thereby producing a most desirable paint material having the same advantages as the varnish above described.

Having now set forth the object and nature of my invention and the method of carrying the same into practical operation, what I claim as new and useful and of my own invention, and desire to secure by Letters Patent is,—

1. The process of making varnish which consists in glutinizing vegetable proteids with a dilute acid.

2. The process of making varnish which consists in glutinizing vegetable proteids with a dilute inorganic acid.

3. The process of making varnish which consists in glutinizing vegetable proteids with sulfurous acid.

4. The process of making varnish which consists in glutinizing proteids with a mixture of dilute acids.

5. The process of making varnish which consists in glutinizing vegetable proteids with a glutinizing agent and adding a disinfectant.

6. The process of making varnish which consists in glutinizing vegetable proteids with a glutinizing agent and adding a phenol to disinfect the glutinized substance.

7. The process of making liquid varnish which consists in glutinizing vegetable proteids and condensing the glutinized mass with a condensing agent.

8. The process of making liquid varnish which consists in glutinizing vegetable proteids and condensing the glutinized mass with an active methylene compound.

9. The process of making liquid varnish which consists in glutinizing vegetable proteids and condensing the glutinized mass with formaldehyde.

10. The process of making liquid varnish which consists in glutinizing vegetable proteids and condensing the glutinized mass with a condensing agent and varying the amount of water in the mass.

11. In the manufacture of liquid varnish the process which consists in separating the proteidal substances from vegetable proteid containing materials, and then glutinizing such substances with a glutinizing agent in its aqueous solution.

12. In the manufacture of liquid varnish the process which consists in separating the proteidal substances from vegetable proteid containing materials, then refining said substances, and finally glutinizing the refined substances with a glutinizing agent.

13. In the manufacture of liquid varnish the process which consists in crushing vegetable proteid containing materials and extracting in a liquid the proteidal substances from the crushed mass, then separating the proteidal substances from the liquid and glutinizing the same with a glutinizing agent.

14. In the manufacture of liquid varnish the process which consists in crushing vegetable proteid containing materials and extracting in a liquid the proteidal substances from the crushed mass, then purifying the liquid and separating the proteidal substances contained therein, and finally glutinizing the separated proteidal substances with a glutinizing agent.

15. In the manufacture of liquid varnish the process which consists in separating the proteidal substances from proteid containing material, in a liquid solution, then precipitating the proteidal substances with an acid, and finally glutinizing the precipitated substances with an inorganic acid.

16. In the manufacture of liquid varnish the process which consists in separating the proteidal substances from proteid containing material, in a liquid solution, then precipitating the proteidal substances with an acid, and finally glutinizing the precipitated substances with an inorganic acid and condensing the glutinized mass with a condensing agent.

17. The process which consists in glutinizing vegetable proteids and then adding a pigment to the mass.

18. The process which consists in glutinizing vegetable proteids with a dilute acid and then adding a pigment to the mass.

19. The process which consists in glutinizing vegetable proteids with a dilute inorganic acid and then adding a pigment to the mass.

20. The process which consists in glutinizing vegetable proteids with sulfurous acid and then adding a pigment to the mass.

21. The process which consists in glutinizing vegetable proteids and condensing the glutinized mass with a condensing agent and then adding a pigment to the mass.

22. Liquid varnish, consisting of glutinized vegetable proteids.

23. Liquid varnish, consisting of glutinized vegetable proteids and a condensing agent.

24. Liquid varnish, consisting of glutinized vegetable proteids and a pigment.

25. Liquid varnish, consisting of glutinized vegetable proteids, a condensing agent and a pigment.

26. Liquid varnish, consisting of glutinized vegetable proteids, a condensing agent and a disinfectant.

27. Liquid varnish, consisting of glutinized vegetable proteids, a condensing agent, a disinfectant and a pigment.

28. Varnish consisting of the condensation product of glutinized vegetable proteids with an active methylene compound.

29. Varnish consisting of glutinized vegetable proteids condensed with a condensing agent.

30. Varnish consisting of an emulsified solution of gelatinized protein derivatives.

31. Varnish consisting of a condensation product of emulsified solution of gelatinized proteids.

32. The process which consists in emulsifying a solution of gelatinized proteids into a viscid semi-transparent sticky fluid.

33. The process which consists in emulsifying a solution of gelatinized proteids.

In testimony whereof I have hereunto set my hand on this 23d day of November, A. D. 1916.

SADAKICHI SATOW.